United States Patent [19]
Frei et al.

[11] Patent Number: 5,651,528
[45] Date of Patent: Jul. 29, 1997

[54] VACUUM VALVE

[75] Inventors: Hugo Frei, Werdenberg; Peter Keller; Martin Boesch, both of Azmoos, all of Switzerland

[73] Assignee: Balzers Aktiengesellschaft, Balzers, Liechtenstein

[21] Appl. No.: 431,271

[22] Filed: Apr. 28, 1995

[30] Foreign Application Priority Data

May 9, 1994 [CH] Switzerland .................. 1443/94

[51] Int. Cl.$^6$ ............................................. F16K 31/12
[52] U.S. Cl. ................................... 251/54; 251/335.3
[58] Field of Search ........................... 251/54, 335.3

[56] References Cited

U.S. PATENT DOCUMENTS

| | | | |
|---|---|---|---|
| 3,159,774 | 12/1964 | Dube et al. | 251/54 |
| 3,273,095 | 9/1966 | Rossenbeck | 251/54 |
| 3,326,511 | 6/1967 | Hallgreen | 251/54 |
| 3,633,869 | 1/1972 | Lehmann | 251/54 |
| 3,810,489 | 5/1974 | McManus et al. | 137/495 |
| 4,589,627 | 5/1986 | Grotloh et al. | 251/25 |

FOREIGN PATENT DOCUMENTS

| | | |
|---|---|---|
| 0015192 | 2/1980 | European Pat. Off. . |
| 0264466 | 4/1988 | European Pat. Off. . |
| 1136175 | 9/1962 | Germany . |
| 1204485 | 11/1965 | Germany . |
| 1234113 | 2/1967 | Germany . |
| 3338111 | 5/1985 | Germany . |
| 0969825 | 9/1964 | United Kingdom . |
| 1031654 | 6/1966 | United Kingdom . |
| 1071644 | 6/1967 | United Kingdom . |
| 2071817 | 2/1981 | United Kingdom . |
| 2241039 | 8/1991 | United Kingdom . |
| 2153973 | 8/1991 | United Kingdom . |

*Primary Examiner*—A. Michael Chambers
*Attorney, Agent, or Firm*—Notaro & Michalos P.C.

[57] ABSTRACT

A vacuum valve has a valve stem with a magnetic drive for moving the valve stem in the opening direction of the valve. A piston configuration is connected to the valve stem and is enclosed within a double-cylinder configuration. Overflow or inflow/outflow lines connected between the two chambers of the double-cylinder configuration, contain flow conductance value setting elements such as valves or filters, for setting a damping effect on movement of the piston configuration, thus damping movement of the valve stem.

13 Claims, 2 Drawing Sheets

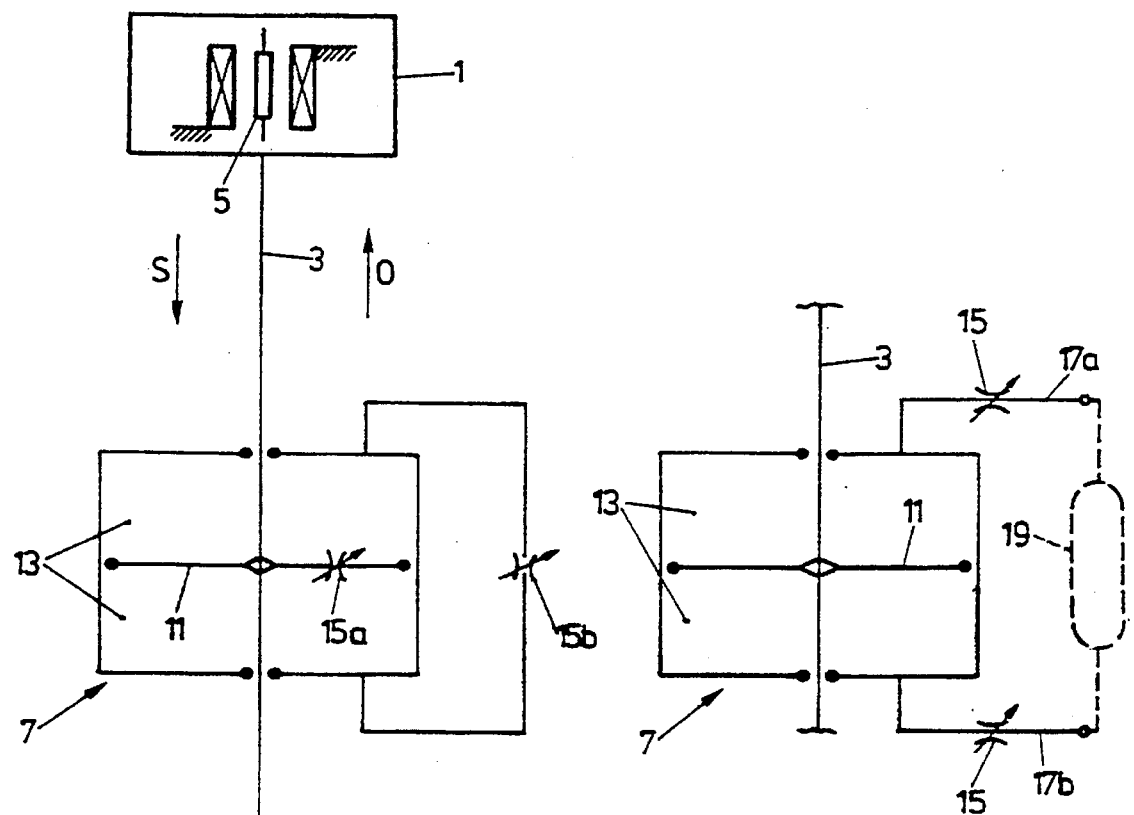
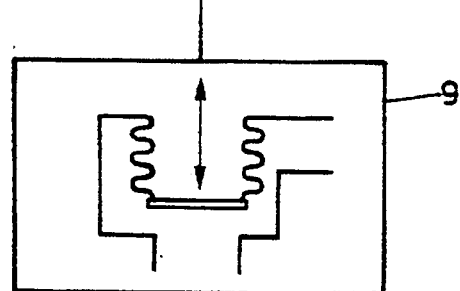
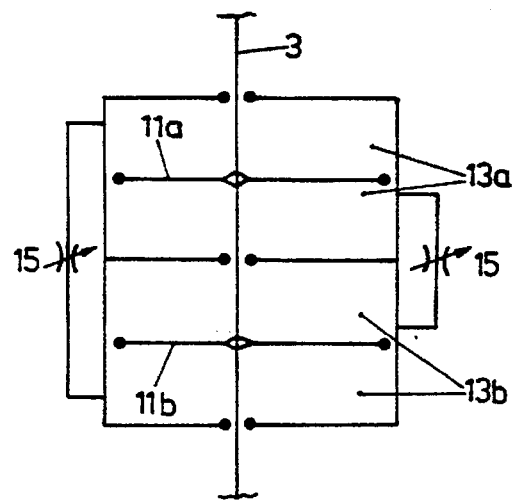
FIG.1
FIG.2
FIG.3

VACUUM VALVE

FIELD AND BACKGROUND OF THE INVENTION

The present invention relates to a vacuum valve of the type having a valve stem and a magnetic drive.

Electromagnetically operating vacuum valves are known in which the electromagnetic drive acts only in the direction of opening, so that, in the event of a power failure, the valve is brought into the secure closed position. In the case of such electromagnetically driven vacuum valves it is further known to switch, for the purpose of holding open the valve in the stationary position, by switching the coils over to a holding-open force which is significantly lower with respect to the opening force. This prevents the generation of excessive temperatures during the stationary opening operation which, as a rule, in single-coil implementations is realized by means of a protective mechanism against excessive temperatures.

Magnetic drives for vacuum valves acting in the opening and closing direction are the exception rather than the rule, since valves operated magnetically only in the opening direction and returned into the closed position mechanically by means of springs entail the advantage that in the event of power failure the valve is brought into the secure closed position.

The service life of such vacuum valves is limited to approximately 200,000 actuation cycles. This short service life is due, in particular, to chatter phenomena during the electromagnetic movement into the closed position, as well as through the spring-actuated movement into the closed position. It must be taken into consideration that between the actuated valve stem/valve disc and housing, a metal bellows is conventionally disposed. This bellows encapsulates the closure spring elements and frictional seals on the valve stem, against the vacuum atmosphere. Reverberations of the bellows are a problem.

Prevention of this problem is the goal of the technique disclosed in EP-A 0 264 466. Reverberations of the bellows especially limits the service life of the valve.

Regarding the prior art with respect to magnetically actuated vacuum valves, reference is furthermore made to CH-A 653 103 which describes a pneumatic regulation device for a vacuum valve, EP-A 0 219 572 which describes a combination of electric lifting solenoid and permanent magnets, DE-A 3 704 504 which describes an electromagnetically actuated pipe joint valve, and EP-A 0 173 115 which also discloses a solenoid valve for vacuum applications.

SUMMARY OF THE INVENTION

It is the task of the present invention to suggest a vacuum valve of the above mentioned type in which the length of the service life is significantly improved.

This task is solved through the above described vacuum valve which is implemented by having the valve stem act as piston in a damping medium-filled double-cylinder configuration. An overflow and/or inflow/outflow value for the cylinder configuration can be set to adjust the amount of damping to be specific to the direction of actuation, that is, whether the valve stem is moving toward an open or toward a closed position.

Preferred embodiments of the vacuum valve according to the invention include at least one piston in a double-sided cylinder chamber, or pairs of cylinder chambers acting on opposite sides of the piston.

Especially preferred embodiments include cylinder configuration chambers, acting oppositely via a line configuration for overflow, and connected to a closed pressure medium system. No damping medium is drawn into the cylinder configuration or expelled from it. For this reason, the vacuum valve according to the invention is particularly cost-effective, and an entrainment of particles into the piston/cylinder configuration is avoided.

In another embodiment, the invention is achieved through the selection of pneumatic damping and not hydraulic damping such as water, oil, gelatine, or ferro-fluidic damping or a combination thereof, which according to the invention is also possible. Potential residual leakage of the damping medium into the vacuum system becomes significantly less critical with a pneumatic system, and moreover, the constructional expenditure is significantly decreased, since atmospheric air can preferably be used as the damping medium.

According to a procedure of the invention, the provided members, defining to a major extent the flow conductance, can simultaneously be used for filtering the damping medium at the point of inflow or outflow with respect to the provided chambers at the cylinder configuration.

In the case of another implementation of the invention, a particularly compact construction results in that the piston arrangement which, in any event, is guided in the particular cylinder chamber with the least possible sealed air gap, is used as the magnet armature of the magnetic drive, in which, with respect to the air gap, for the coil configuration the same conditions apply.

For an enhancement of the closing force a magnet configuration acting coaxially to the valve stem is provided. That is, a configuration in which the driving magnetic field acts through an air gap oriented coaxially and axially is used.

The valve according to the invention is further preferably implemented as a valve actuated magnetically for opening and actuated through springs for closing.

BRIEF DESCRIPTION OF THE DRAWINGS

In the following the invention will be explained in conjunction with the drawing wherein:

FIG. 1 is a function block diagram illustrating the basic structure of the vacuum valve according to the invention, in the form of two potentially combinable, especially preferred embodiments;

FIG. 2 is a diagram of the damping unit according to FIG. 1 in a further embodiment of the vacuum valve according to the invention;

FIG. 3 is a diagram of an example of a further development of the vacuum valve according to the invention with a series connection of two damping units, implemented according to the embodiment in FIG. 1.

DESCRIPTION OF THE PREFERRED EMBODIMENTS

Figure 4:
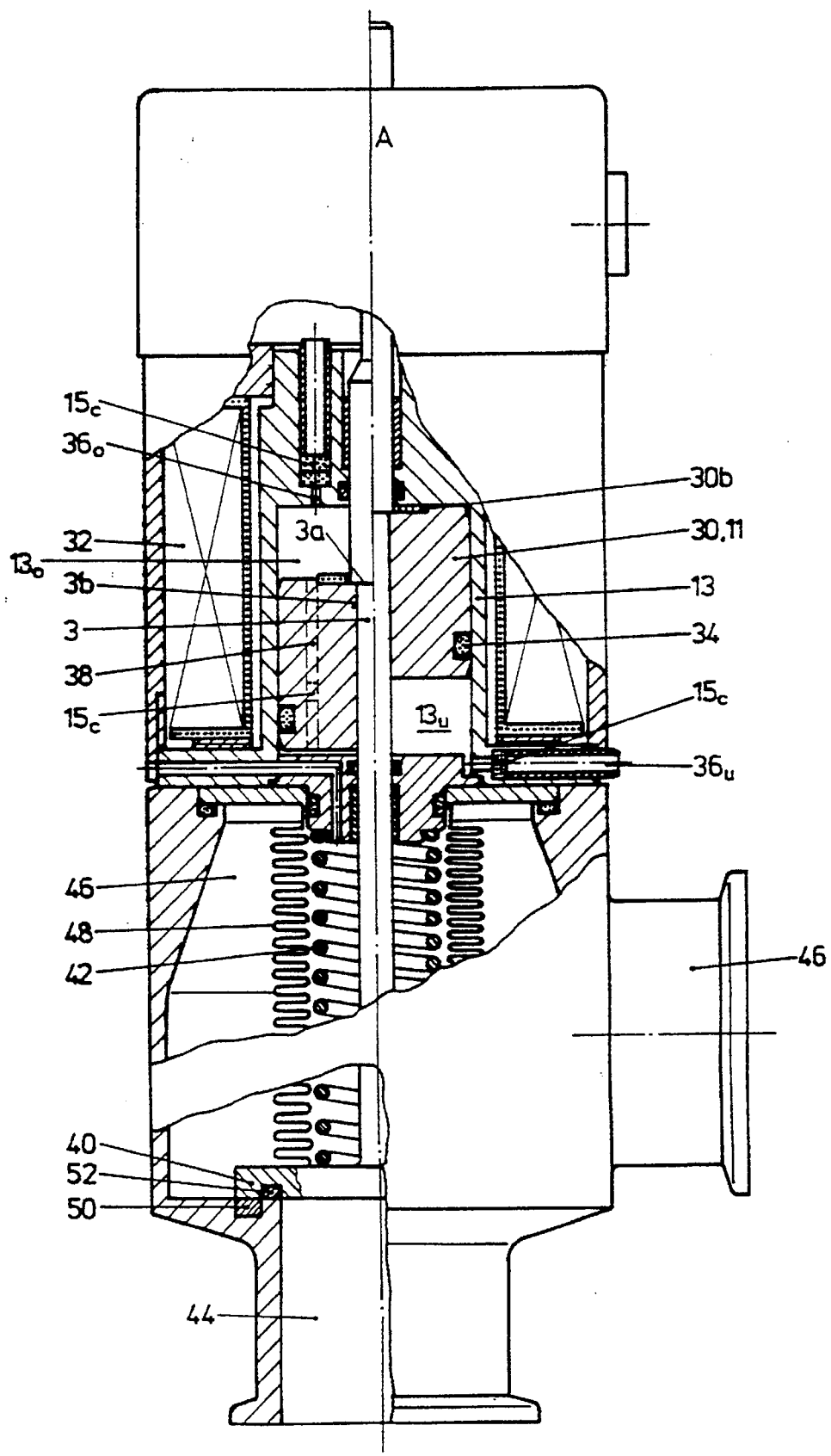
FIG. 4 is a partial longitudinal sectional view of an embodiment, currently preferred, of a vacuum valve according to the invention.

According to FIG. 1, the vacuum valve according to the invention can be divided into three function units. A drive unit 1, as shown schematically, acting electromagnetically on an armature 5 disposed on a valve stem 3 and either acting in the direction of closing S and the direction of opening O; or only in the direction of opening O with a spring mechanism, not depicted in FIG. 1, carrying out the driving in the direction of closing S, and act on the valve stem 3. The motion of the valve stem, and consequently of the valve disc, is damped in a manner still to be described, by a damping unit 7. The valve stem 3 acts further on a closure/opening unit 9 on which technical vacuum connections are either established or broken.

The damping unit 7, related in particular to the present invention, comprises a section 11, acting as piston connected to the valve stem 3, and referred to in the following as a damping piston. At this point reference is made to the fact that valve stem 3 with unit 9 can more generally form an opening and closure element, such as, for example, the slide of a sliding valve. The damping piston 11 cooperates with a double cylinder configuration, that is, stationary in a housing, denoted in FIG. 1 by 13. Upon actuation of the valve stem 3 and corresponding shifting of the damping piston 11 in the double-cylinder configuration 13, overflow lines act between the complementarily loaded and unloaded chambers of the double-cylinder configuration. By means of preferably settable overflow control elements 15a on piston 11 and 15b in a side of the housing or in the cylinder configuration, the damping characteristic can be set or given. Elements 15a, 15b can be realized by correspondingly dimensioned flow control sites or line cross sections, by means of flap valve configurations, through settable diaphragms or, as will be described later, and preferably, through filter insets in the overflow opening or line, which determine the flow conductance as desired. The elements 15a, 15b comprise potentially flow control effects which are specific with respect to the direction of flow, such as for example if realized with flap valves.

The filter insets for setting the desired characteristic, and potentially different characteristics, are preferably exchangeable for opening and closing operations.

The embodiment depicted schematically in FIG. 1 has further the significant advantage that the damping medium system is self-contained. According to the invention, as damping medium, preferably a gas and in particular ambient air, is used, however, it is entirely possible, as also evident in FIG. 1, to use as the damping medium a liquid, thus to carry out the damping hydraulically.

FIG. 2 depicts further embodiments of the damping unit 7 on the vacuum valve according to the invention, in which inflow and outflow lines 17a, 17b to or from the double-cylinder configuration chambers 13, separated from the damping piston 11, are provided which communicate with a damping medium supply 19 shown in dashed lines, such as, for example and preferably, with ambient air. Here also the setting elements 15, explained in conjunction with FIG. 1, for setting the damping characteristic for valve stem 3, are provided.

For the person skilled in the art it is understood that potentially two or more of the cylinder configurations represented in conjunction with FIGS. 1 and 2, with respect to the action on the valve stem 3 can be connected in series as is represented, by example and readily comprehensible in FIG. 3 which has piston parts 11a and 11b in double cylinders 13a and 13b.

For the sake of clarity, for the parts significant to the invention, which have already been explained in conjunction with FIGS. 1 to 3, identical reference symbols have been used in FIG. 4. The representation shows to the right of a valve axis A, the valve in the open position, and to the left, the valve in the closed position.

The armature 30 of the magnetic opening drive unit 1 according to FIG. 1, formed by the armature and a coil configuration 32, is supported on the valve stem 3 so as to be axially displaceable. The armature 30 acts in the direction of opening of the valve on a shoulder 3a formed into the valve stem 3. The armature 30 is furthermore supported on the valve stem 3 so as to be floating, which, in practice, is realized by a bore 3b in armature 30 provided with clearance with respect to the small-diameter section forming the shoulder 3a of valve stem 3.

In this way, armature 30 in the open position (the right side of FIG. 4), can adjust to be absolutely flush and without a gap to a planar stationary opposing face, independently of fabrication tolerances. The open position is damped by means of a damper 30b which acts against the face in the valve housing. Armature 30, acting simultaneously as damping piston 11, and called an armature piston 30, 11 in the following, slides by means of seals 34 sealingly in the double-cylinder configuration 13, in which the armature piston 30, 11 defines the cylinder chambers $13_o$, $13_u$, depending on its position.

A first inflow/outflow line $36_u$ terminates in the lower chamber $13_u$ of the cylinder configuration 13. A further inflow/outflow line $36_o$ terminates in the upper chamber $13_o$. As the flow setting element $15_c$, according to FIG. 3, filters having selectable flow conductance values are set into the inflow/outflow lines $36_u$ and $36_o$. The filters are exchangeable. As shown in dashed lines at 38, additionally, or instead of lines 36, in the armature piston 30, 11, an overflow line 38 is formed, in which also, for example, a filter of given flow conductance value $15_c$, which is preferably exchangeable, is installed. As far as described, the valve according to FIG. 4 has an overflow line 38 of the variant with $15_a$ of FIG. 1 and lines $36_u$ and $36_o$ corresponding to the structure according to FIG. 2. The valve stem 3 acts on a valve disc 40, on which is supported a closure spring 42, which abuts the side of the cylinder configuration. The valve disc 40 closes or opens a vacuum pass-through connection between lines 44 and 46 of a vacuum system and is encapsulated by means of a metal bellows 48 against valve stem 3 with closure spring 42 and damping unit/driving unit 7 or 1.

Preferably a permanent magnet ring 50 is provided about the opening of line 44 to be closed by valve disc 40, as a realization form of an axially magnetic field-enhanced valve closure. In the closed position of valve disc 40, depicted on the left of axis A, the magnetic field-enhanced valve closure ensures a permanently sealing closure by means of seal 52 on margin of the opening of line 44.

While specific embodiments of the invention have been shown and described in detail to illustrate the application of the principles of the invention, it will be understood that the invention may be embodied otherwise without departing from such principles.

What is claimed is:

1. A vacuum valve comprising:

means defining a controlled pass-through connection (44, 46) for a vacuum;

a valve stem (3) for movement in the pass-through connection;

a bellows encapsulating the valve stem in the pass-through connection;

a magnetic drive (1) for moving the valve stem and the bellows at least into a position for opening the pass-through connection, the valve stem being movable in two directions in the pass-through connection; and a bellows reverberation damping arrangement comprising;

a piston configuration (11) engaged to the valve stem; and a damping medium-filled double-cylinder configuration (13) containing the piston configuration, the double-cylinder configuration having at least one of an overflow line and an inflow/outflow line, each having a conductance value for the damping medium flow between chambers of the double-cylinder configuration, the conductance value being different for the two directions of movement of the valve stem, the damping medium filling the double-cylinder configuration being a gas.

2. A vacuum valve as stated in claim 1, wherein the piston configuration (11) and the double-cylinder configuration (13) comprise at least one piston and a double-sided cylinder chamber acting on the piston (11).

3. A vacuum valve as stated in claim 1, including pairs of cylinder chambers acting oppositely on the piston configuration and connected through an overflow line configuration, disposed (15a) through the piston configuration, the pairs of cylinder chambers forming the double-cylinder configuration.

4. A vacuum valve as stated in claim 1, including pairs of cylinder chambers acting oppositely on the piston configuration and connected through an overflow line configuration, which is stationarily (15b) connected to the cylinder chambers, the pairs of cylinder chambers forming the double-cylinder configuration.

5. A vacuum valve as stated in claim 1, wherein chambers of the double-cylinder configuration are connected to each other by inflow/outflow lines (15c) and a damping medium supply (19).

6. A vacuum valve as stated in claim 1, wherein the damping medium is atmospheric air.

7. A vacuum valve as stated claim 1, wherein the means for setting the flow conductance values on at least portions of at least one of the overflow and inflow/outflow lines for the damping medium, comprise exchangeable or adjustable parts defining the conductance values.

8. A vacuum valve as stated in claim 7, wherein the exchangeable or adjustable flow valves.

9. A vacuum valve as stated claim 1, wherein the means for setting the conductance values comprises filters.

10. A vacuum valve as stated in claim 1, wherein the piston configuration includes at least one piston which is simultaneously a magnet armature (30, 11) of the magnetic drive.

11. A vacuum valve as stated in claim 10, wherein the piston is axially displaceable as the magnet armature and, in a direction of opening of the valve, acts against a stop (3a) on the valve stem (3), and is supported with clearance on the valve stem (3) in such a way that it moves, free of air gaps on a pole shoe face of a magnet configuration (32, 30b) forming the magnetic drive.

12. A vacuum valve as stated in claim 1, including a magnet configuration (50) disposed coaxially with respect to the valve stem (3) and acting axially, forming at least a portion of the magnetic drive (1) for enhancing a closing force of the valve.

13. A vacuum valve as stated in claim 1, wherein the magnetic drive has an opening effect and including a spring mechanism (42) with a closing effect engaged with the valve stem.

* * * * *